United States Patent
Bearden

[11] Patent Number: 6,112,736
[45] Date of Patent: *Sep. 5, 2000

[54] PORTABLE SAW WITH IMPROVED DISCONNECTABLE PLATFORM FOR CUTTING CONCRETE FOR CONTROLLING CRACKS

[76] Inventor: Martin A. Bearden, 3411 Finley Ave., Newport Beach, Calif. 92663-3215

[*] Notice: This patent is subject to a terminal disclaimer.

[21] Appl. No.: 09/046,948

[22] Filed: Mar. 23, 1998

Related U.S. Application Data

[63] Continuation-in-part of application No. 07/804,090, Dec. 6, 1991, Pat. No. 5,941,227.

[51] Int. Cl.[7] .............................. B26D 3/06; B28D 1/04; B28B 11/08
[52] U.S. Cl. ..................... 125/13.01; 451/352; 30/370; 30/371; 30/391; 299/39.3; 404/93; 83/875
[58] Field of Search .................... 83/471.2, 928, 83/674, 487, 875, 574, 745; 125/13.01, 14, 12, 38, 16.03; 451/350, 352; 299/1.5, 39.1, 39.3, 75; 30/370, 388, 371, 375, 390, 391; 264/333; 425/457, 458, 472; 404/93, 94

[56] References Cited

U.S. PATENT DOCUMENTS

| | | | |
|---|---|---|---|
| 1,726,665 | 9/1929 | Heltzel | 404/89 |
| 2,581,477 | 1/1952 | Franks | 299/39.3 |
| 2,673,725 | 3/1954 | Coates | 451/352 X |
| 2,889,141 | 6/1959 | Wilson | 125/13.01 X |
| 2,931,634 | 4/1960 | Ashback et al. | 299/39.3 |
| 2,939,691 | 6/1960 | Lewis | 299/39.3 |
| 2,973,950 | 3/1961 | Tucker | 299/39.3 |
| 3,049,839 | 8/1962 | Smith | 451/350 X |
| 3,301,601 | 1/1967 | Zuzelo | 299/39.3 |
| 3,357,745 | 12/1967 | Cooper | 299/39.3 |
| 3,663,060 | 5/1972 | Shatwell et al. | 299/39.3 |
| 3,747,981 | 7/1973 | Zuzelo | 299/39.3 |
| 4,054,179 | 10/1977 | Destree | 173/32 |
| 4,078,309 | 3/1978 | Wilson | 30/375 |
| 4,204,714 | 5/1980 | Jacobson et al. | 299/1.5 |
| 4,456,303 | 6/1984 | Due | 299/10 |
| 4,769,201 | 9/1988 | Chiuminatta et al. | 264/154 |
| 4,777,726 | 10/1988 | Flowers | 30/374 |
| 4,840,431 | 6/1989 | Jedick | 299/39.3 |
| 4,891,858 | 1/1990 | Wachter | 15/82 |
| 5,165,317 | 11/1992 | Findlay | 83/574 |
| 5,167,215 | 12/1992 | Harding, Jr. | 125/13.01 |

*Primary Examiner*—Rinaldi I. Rada
*Assistant Examiner*—Boyer Ashley
*Attorney, Agent, or Firm*—Harold D. Messner

[57] ABSTRACT

An apparatus for cutting grooves in a green concrete slab having at least one terminating side edge transverse to a broad top surface in a low cost manner is described and includes the following elements: a hand-held portable rotary saw, supported on a rollable platform disconnectably connected to and supporting the relative to the green concrete slab. The rollable platform includes a planar base in surface contact with a conventional guide plate of the saw, and flared side walls extending outwardly from the planar base an anchoring portion adapted to receive a human-generated force to provide rectilinear travel along a preselected direction over the green concrete slab. The planar base also includes a slot in alignment with an opening in the guide plate through which the saw blade extends whereby a working plane of reference is defined that intersects an axis of rotation of the saw blade whereby a maximum depth of cut is easily defined coincident with the working plane of reference. The rollable platform also includes a set of rollers in rolling contact with the green concrete slab to facilitate the rectilinear travel wherein first and second pairs of rollers define parallel axes of rotation normal to said pre-selected direction of travel that facilitate operations in a low cost manner.

13 Claims, 9 Drawing Sheets

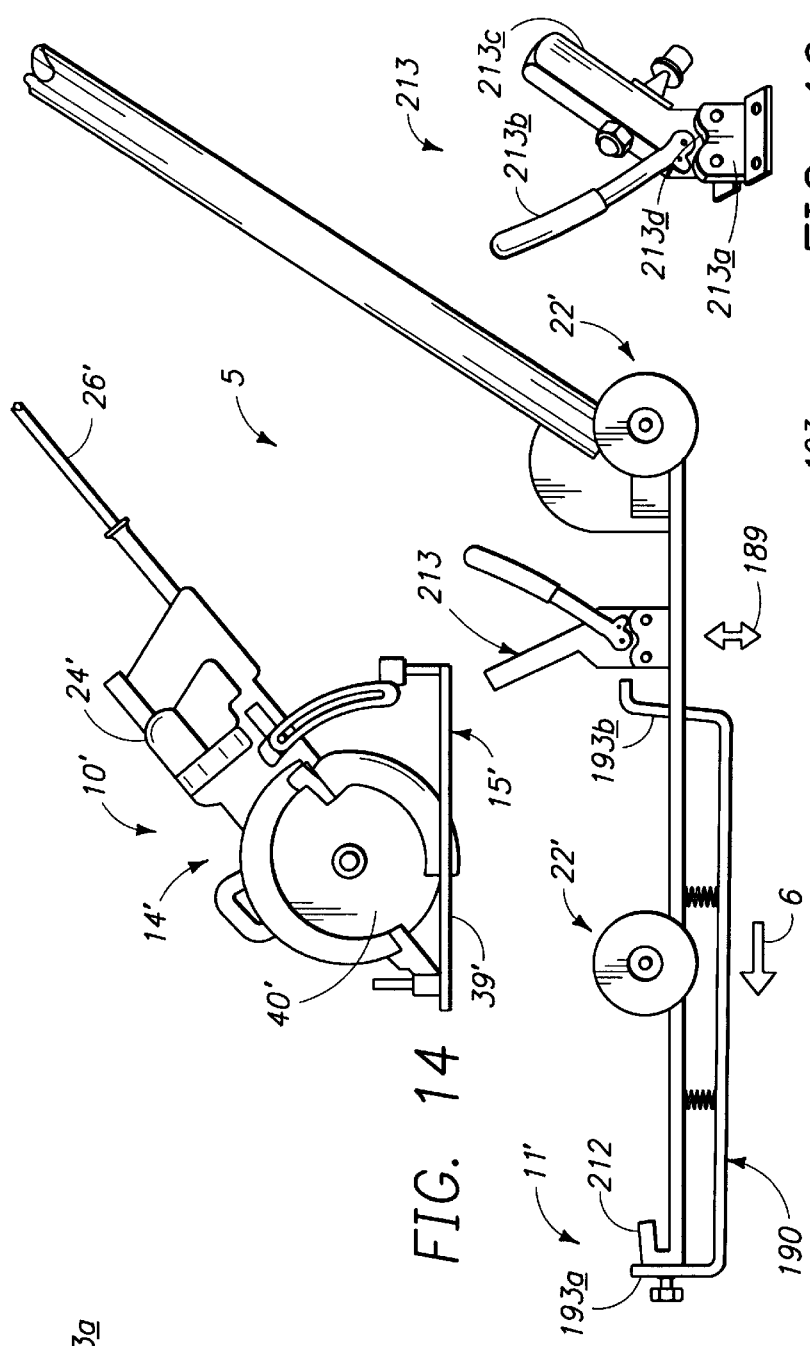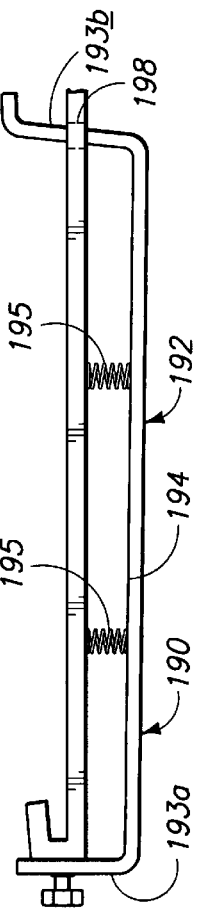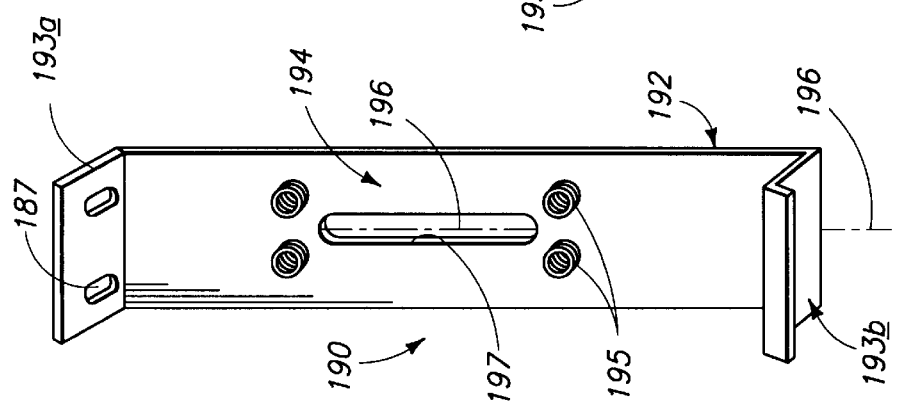

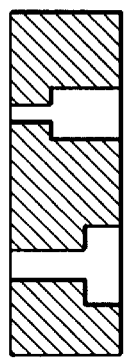
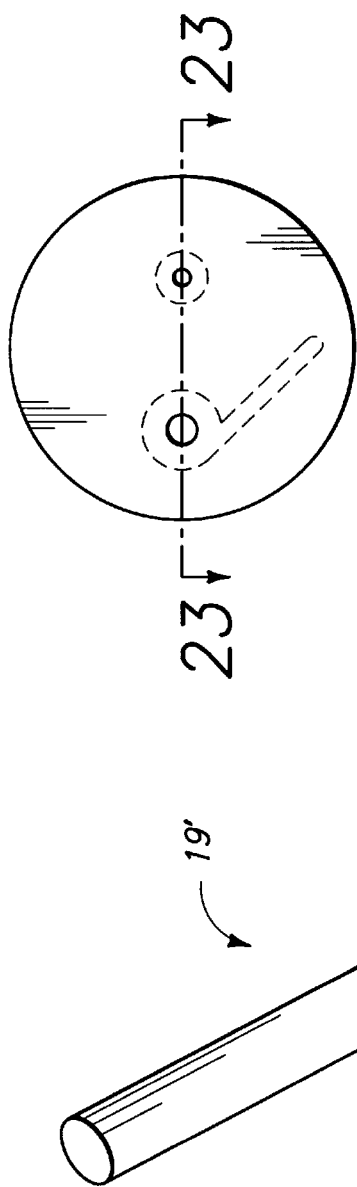
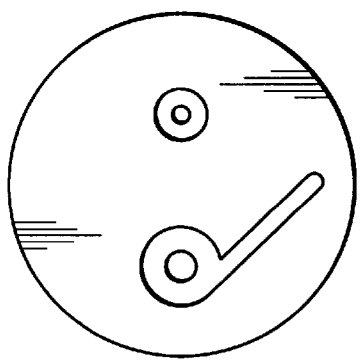
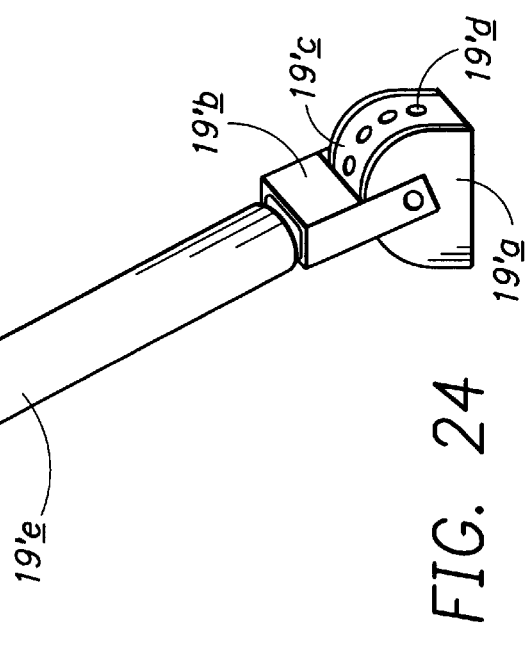

PORTABLE SAW WITH IMPROVED DISCONNECTABLE PLATFORM FOR CUTTING CONCRETE FOR CONTROLLING CRACKS

This is a cip of Ser. No. 07/804,090 filed Dec. 6, 1991, now U.S. Pat. No. 5,941,227.

SCOPE OF THE INVENTION

The present invention relates to an apparatus and method for cutting grooves in soft or green concrete and more particularly to a hand-held worm-gear driven portable rotary saw conventional for use in construction, in disconnectable connection with a modified rollable platform. Its purpose: to cut accurate groves in a broad, top surface of the green concrete which, more likely than not, has terminating side edges transverse to the aforementioned broad surface. Such cutting operations occur before the green concrete has hardened sufficiently to allow cutting by a conventional abrasive concrete saw.

DEFINITIONS

In this applications, the following terms or term has the following meanings.

"Green" concrete is newly poured concrete, occurring after "bull floating" and finishing has been completed, but before stress due to drying has occurred and has been defined as concrete having a hardness such that a 1.125 inch diameter steel rod with a flat end and weighing about 5.75 pounds causes an indentation in the surface of the concrete of about $1/32$ to $5/8$ inch when the rod is drop from a height of about 24 inches above the surface of the concrete, whereby cutting operations therefor, occurs before the green concrete has hardened sufficiently to allow cutting by a conventional abrasive concrete saw.

"Forward end" relates to the portion of the apparatus of the invention most remote from the push force applied to the apparatus.

"Rearward end" relates to the portion of the apparatus of the invention nearest to or adjacent to the push force applied to the apparatus.

BACKGROUND OF THE INVENTION

It is known to use a saw blade attached to a platform to score or cut grooves in "soft" concrete to relieve stress as the latter dries. ("Soft" concrete is newly poured concrete, occurring after "bull floating" and finishing has been completed, but before stress due to drying has occurred.)

The dimensions of the groove: about 1 inch in depth by about $3/16$ inches in width. The length varies. Its purpose: to control direction and extend of cracking of the concrete. This is because the grooves in the soft concrete provide weakened planes. Such planes pass usually vertically through the grooves. Hence as the concrete cures and shrinks, the cracks are along such planes but since they begin at the trough of the groove, such cracks are not visible at the surface of the slab.

In U.S. Pat. No. 4,769,201, there is described such a concrete saw. Rollers are attached to three corners of a base plate. But because of need to add pressure about the rotating blade as the cut is made (usually, to prevent "spalding" (irregular side edges) of the cut, a pressure plate is attached to the fourth corner inline with the push pole. Since the pressure plate, and blade are cantilevered from the platform outside the rolling plane of the single inline roller (i.e., outside a horizontal plane through the roller), experience shows that a sidewise torque is imparted to the blade and pressure plate. Hence, the device in some cases as where the concrete has a large number of surface rocks, may be difficult to control. Also, a large amount of the dust is emitted as cutting occurs often obscuring the pre existing line of sight guiding the user. Dry cutting of dried, firm concrete is also difficult because of these factors. In addition, the position of the rollers plus pressure plate vis-a vis the saw blade position of maximum penetration, requires the use of a separate entry and exiting platform at the edge of the stab to being and end the cut.

SUMMARY OF THE INVENTION

In accordance with the invention, a hand-held worm-gear driven portable rotary saw conventional for use in construction, is disconnectable connected to a modified rollable platform. Its purpose: to cut accurate grooves in a broad, top surface of a green concrete slab having terminating side edges transverse to the aforementioned broad surface. In more detail, the resulting apparatus comprises:

a hand-held portable rotary saw conventional for use in construction work including a saw blade defining an axis of rotation for providing an up-cut cutting direction, a rollable platform disconnectably connected to the saw including a set of front rollers and a set of rear rollers attached to an underside of the platform in rolling contact with a top surface of a green concrete slab.

Each of the sets of rollers define a dynamically advancing rolling plane that passes through the axes of rotation of the rollers and their intersection with the top surface of the green concrete slab. In this way, human-engendered push force for advancing the co-performing platform and saw relative to the green concrete slab, can be positioned relative to the advancing rolling planes so that a minimum disruptive torque is imparted to the saw blade during operations. In addition the positioning of the saw relative to the platform can be enhanced such that the saw blade completes its maximum cut within the green concrete slab at a position that is well forward of both rolling planes. Thus such cuts can be completed without the front set of rollers encountering a transverse edge of the slab.

DETAILED DESCRIPTION OF THE DRAWINGS

FIG. 14 is a side elevational view of an improved platform supporting a conventional, hand-held rotary saw thereon but in which the latter is shown in exploded position above the improved platform prior to attachment;

FIG. 17 is a perspective detail of a pressure plate assembly of the invention;

FIG. 18 is a side view of the pressure plate assembly of FIG. 17 in which the latter is shown in an attachment mode relative to the platform of FIGS. 14–16;

FIG. 19 is a perspective detail of a locking vise anchor used in the invention;

FIG. 21 is a top view of the cam body of the locking cam of FIG. 20;

FIG. 22 is a bottom view of the cam body of the locking cam of FIG. 20;

FIG. 23 is a section taken along line 23—23 of FIG. 21;

FIG. 24 is a perspective view of the push rod attachment;

DETAILED DESCRIPTION OF EMBODIMENTS OF THE INVENTION

Figure 1:
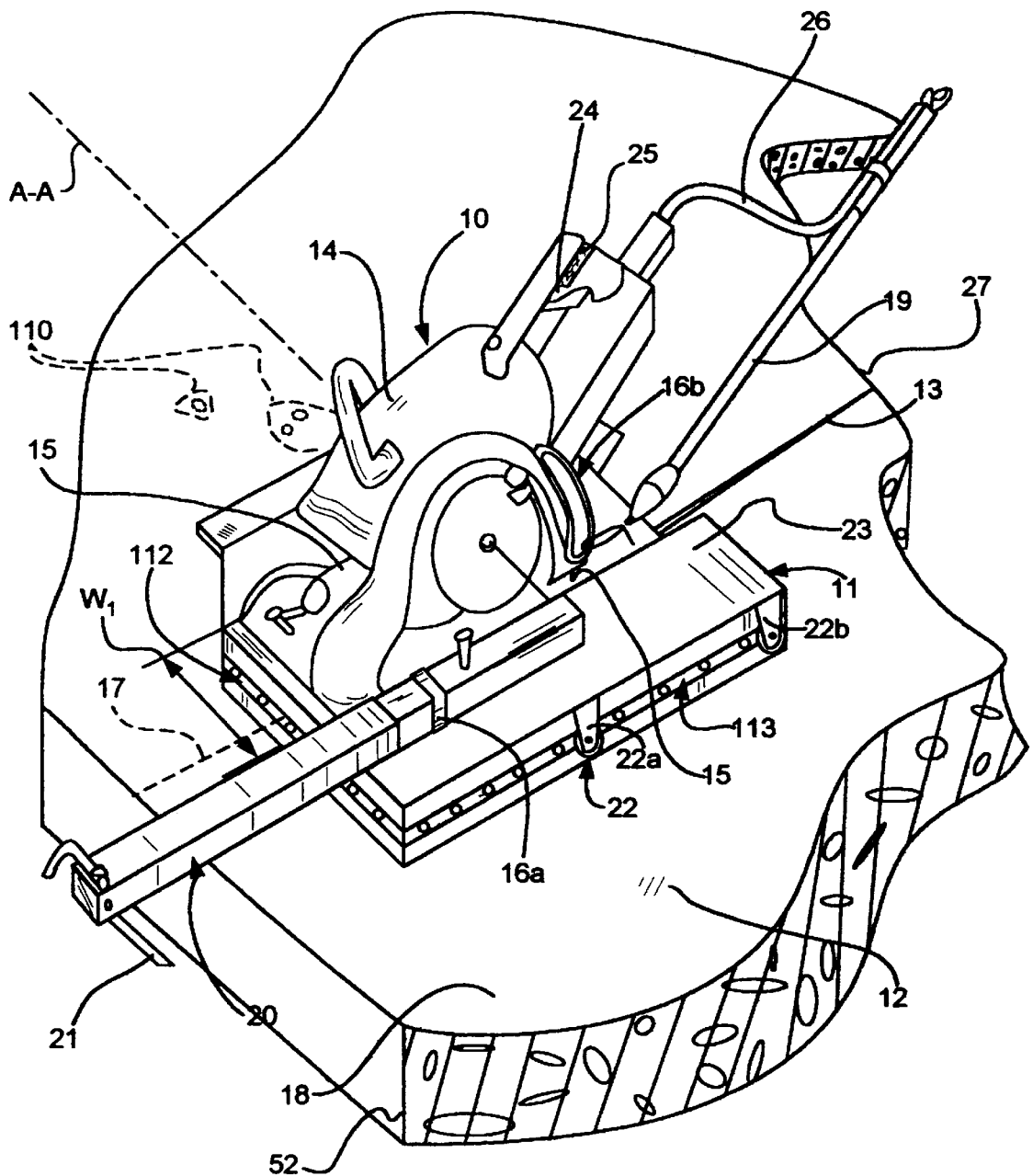
FIG. 1 is a perspective view of a rotary, portable hand-held saw in disconnectable contact with a rollable platform atop a slab of newly poured green concrete to provide a transverse cut to relieve stress in the slab.

Referring to FIG. 1, there is shown a hand-held portable saw 10 in disconnectable contact with platform 11 for use atop a slab 12 of newly poured green concrete to provide a transverse cut 13 to relieve stress. The saw 10 has an axis of rotation A—A and includes a housing 14 and guide plate 15 connected to each other by a pair of bolt-nut fasteners 16a, 16b, respectively, the details of which are set forth below.

The rotating saw 10 and platform 11, in combination, are moved along sight line 17 (usually a chalked line) on top surface 18 of the green concrete 12 by an user (not shown). Such user applies force to the platform 11 via a push rod 19.

Guide arm 20 attached to the platform 11 includes a marking pin 21 alignable with sight line 17. Movement over surface 18 of the slab 12 is provided by sets of rollers 22. The sets of rollers include a forward or front pair 22a and a rearward or rear pair 22b attached to undersurface 23 of the platform 11.

The saw 10 includes an ON-OFF trigger 24 held in the ON-position by a clasp 25. Energy to power the saw 10 flows from an electrical source via a conductor 26 attached to the push rod 19 by a second clasp 27.

Figure 2:
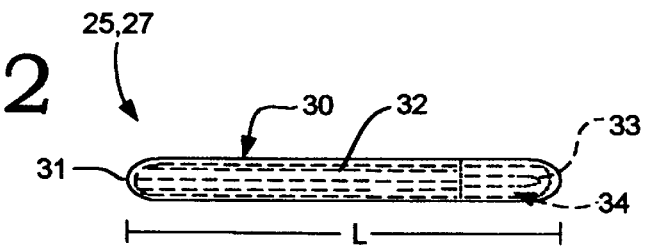
FIG. 2 is a side elevational view of a strap used in conjunction with the portable saw of FIG. 1.

FIG. 2 illustrates the clasps 25, 27 in more detail.

As shown, the clasps 25, 27 are of the hook-and-loop, quick release type associated with the term "Velcro", a registered mark. Each of the clasps 25, 27 includes a strap 30 formed of nylon or the like having a broad surface 31 fitted with a pile section 32 over 75% of its length L. On opposite broad surface 33 is hook section 34 over the remaining 25% of the length L.

Figure 3:
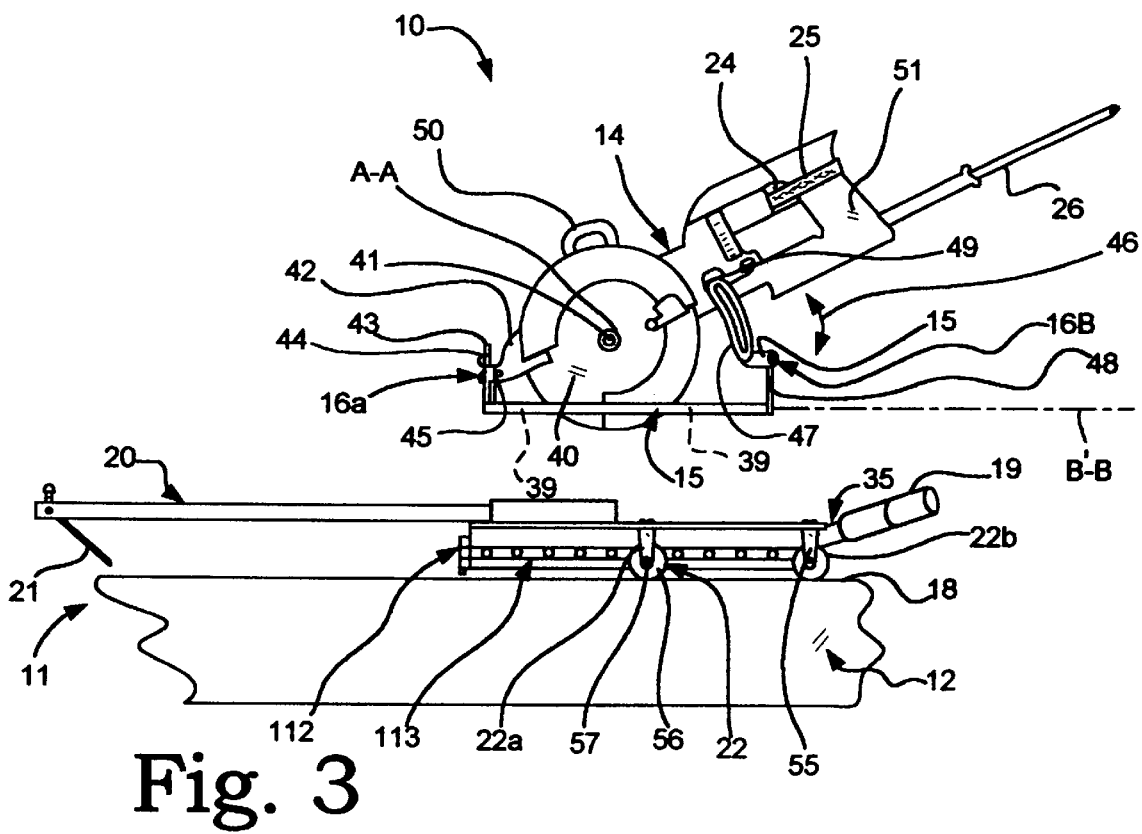
FIG. 3 is a side elevation view of the saw and platform of FIG. 1, exploded to show their positional relationship prior to attachment.
Figure 6:
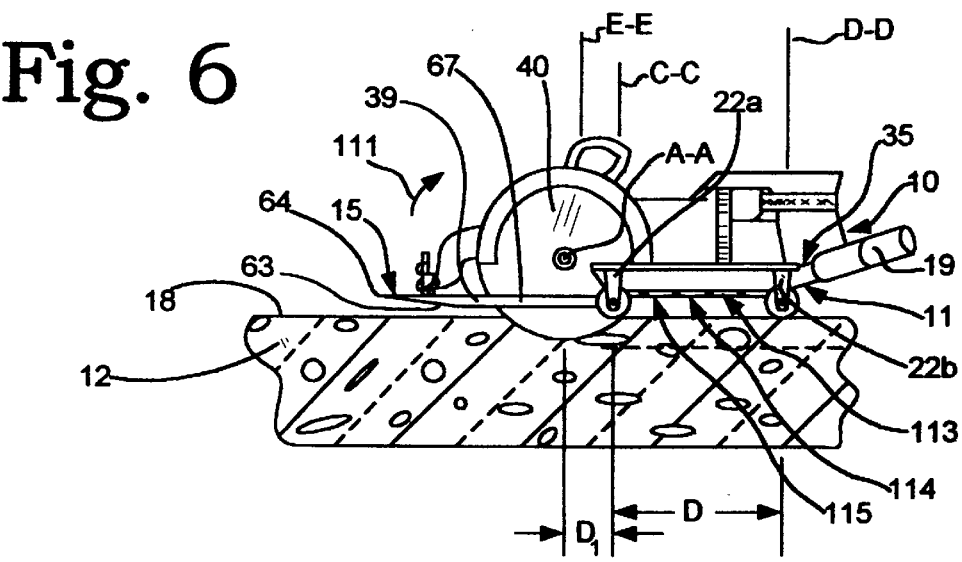
FIG. 6 is a side elevation view of the portable saw and platform of FIG. 1, in which (i) the forward portion of the platform has been broken away to clearly show the guide plate and saw blade of the saw, and (ii) the concrete has been broken away to illustrate how the saw blade (as indicated by its maximum depth of the cut) is forward of the axis of rotation of the forward pair of rollers.

FIGS. 3 and 6 show saw 10 in more detail.

As shown, the saw 10 includes the housing 14 and guide plate 15 previously mentioned. The guide plate 15 is of rectangular cross section, has a central opening 39 of rectangular cross section as well as a width W1 (see FIG. 1). Within the housing 14 is a saw blade 40 attached by a shaft 41 to an electrical motor (not shown), the blade 40 thus having the capability of rotating about the axis of rotation A—A previously mentioned and penetrating through the opening 39 of the guide plate 15 to provide an up-cut direction of rotation. At forward portion 42 of the housing 14 is the pivotally mount fastener 16a previously mentioned, that permits both angular and horizontal movement of the housing 14 (and blade 40 and shaft 41) relative to the guide plate 15. Angular movement uses slotted bracket 43 and stub 44 of the fastener 16a, while horizontal pivotal movement is about shaft 45 through the forward portion 42 of the housing 14. But since the present invention contemplates the saw 10 will be used most often to cut grooves 13 that are normal to the surface 18 of the concrete 12, the axes of symmetry (vertical and horizontal) of the opening 39 will most often be normal to the axis of rotation A—A of the saw blade 40. Pivotal movement is in the directions of arrows 46. When the correct amount of pivotal movement above shaft 45 has occurred (as where a plane of reference B—B (see FIG. 3) through the guide plate 15 is a correct distance below the axis of rotation A—A), the housing 14 is locked in position via the heel bracket-stud-nut fastener 16b previously mentioned. Such rotation controls the depth of cut of the saw blade 40. The heel bracket-bolt-nut fastener 16b comprises slotted arcuate bracket 47 connected to the guide plate 15 at back plate 48. Such fastener 16b includes a rotatable quick release toggle clamp 49 that contacts to a stud (not shown) attached the housing 14 to retain the housing 14 at a correct elevation relative to the guide plate 15. Hence, since the saw 10 has separate integral means to raise and lower the blade 40 relative to the surface 18 of green concrete 12, the invention is relatively inexpensive to construct and operate, and moreover, can be easily operated in firm concrete conditions, as where a deep cut precedes pulverization of a section of concrete, as using a power-driven jack hammer. As previously mentioned, the saw 10 is held in the ON-position by clasp 25 engaging the trigger 24, while electrical conductor 26 transmit energy to operate the saw 10.

Guide handles 50, 51 attach to the housing 14 of the saw 10 in conventional manner to permit the saw 10 to be used in other conventional carpentry-like activities. In this regard, a portable, rotary hand-held saw manufactured by Skil Corporation, Model 77 which is worm gear driven, is adequate.

FIGS. 3, 4, 5 and 6 illustrate platform 11 in more detail.

As shown, the platform 11 is rollerably attached to surface 18 of the green concrete slab 12 via the set of rollers 22 that includes front rollers 22a and rear rollers 22b. Each roller of the pairs 22a, 22b is identical and includes a U-shaped bracket 55 attached to a wheel 56 of common diameter through a shaft 57. The pairs of rollers 22a, 22b have spaced apart axes of rotation 57a, 57b (see FIGS. 3 & 5) and define a pair of dynamically occurring rolling reference planes relative to the surface 18 of the slab 12. The planes are indicated at C—C and D—D in the FIGS. 3 and 4 and are coextensive of the axes of rotation 57a, 57b of the wheels 56 and their intersections F1, F2 with the surface 18 of the slab 12.

Figure 11:
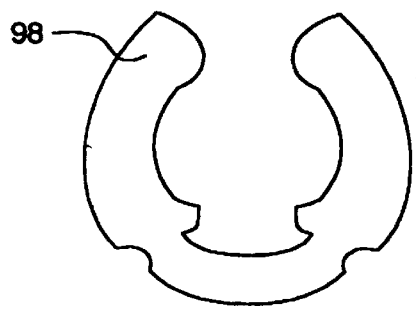
FIG. 11 is a detailed top elevational view of a spring-biasable clip used to form the pair of fasteners of FIGS. 7 and 8.

The rolling plane C—C of the front pair of rollers 22a is offset a lateral distance D from the plane D—D of the rear pair of rollers 22b (see FIG. 6) but is always rearward of of transverse working planes E—E. The working plane E—E passes through axis of rotation A—A of the saw blade 40, to be normal to the top surface 18 of the slab 12 as well as being normal to previously mentioned transverse working plane of reference B—B shown in FIG. 3. That is, depth of maximum cut provided by saw blade 40 (that is also coextensive with working plane E—E) is always a minimum distance D1 forward of rolling plane C—C of the front pair of rollers 22a. Hence, this permits the rotating saw blade 40 to complete its cut (identified with working plane E—E, of course) through the surface 18 of the slab 12 without the front set rollers 22a falling off an transverse edge 52 (see FIG. 11) of the slab 12.

Figure 4:
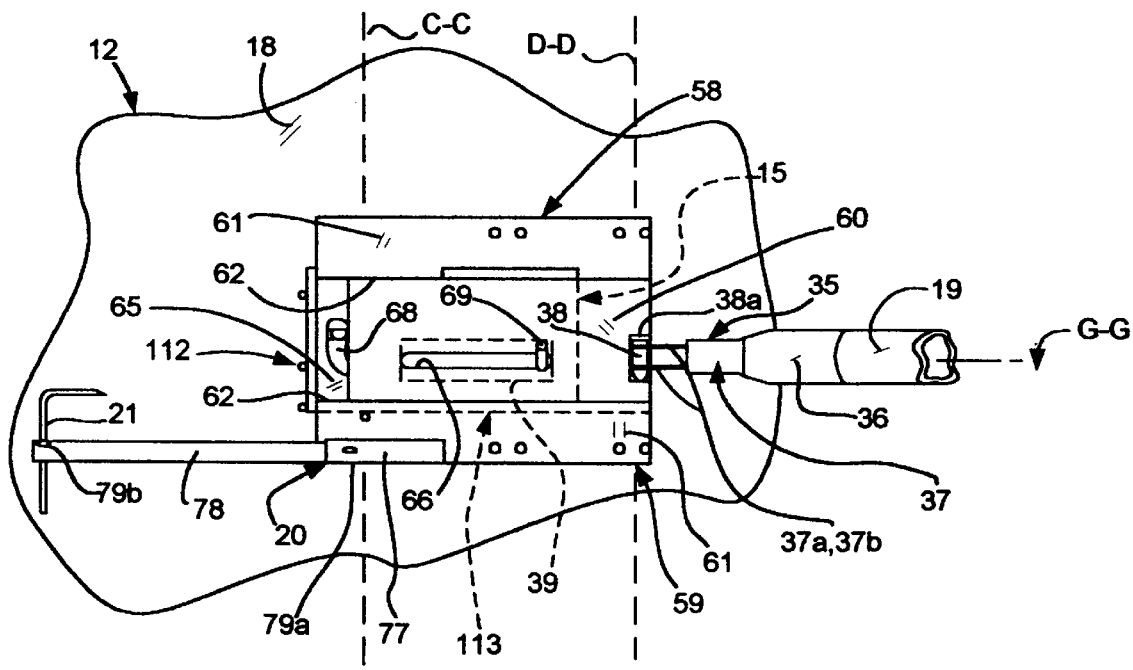
FIG. 4 is a top elevational view of the platform of FIG. 3 in which the guide plate of the saw of FIG. 1 has been superimposed in phantom line to indicate location as well as illustrate a pair of forward and rearward quick release fasteners for disconnectably connecting the saw to the platform.
Figure 5:
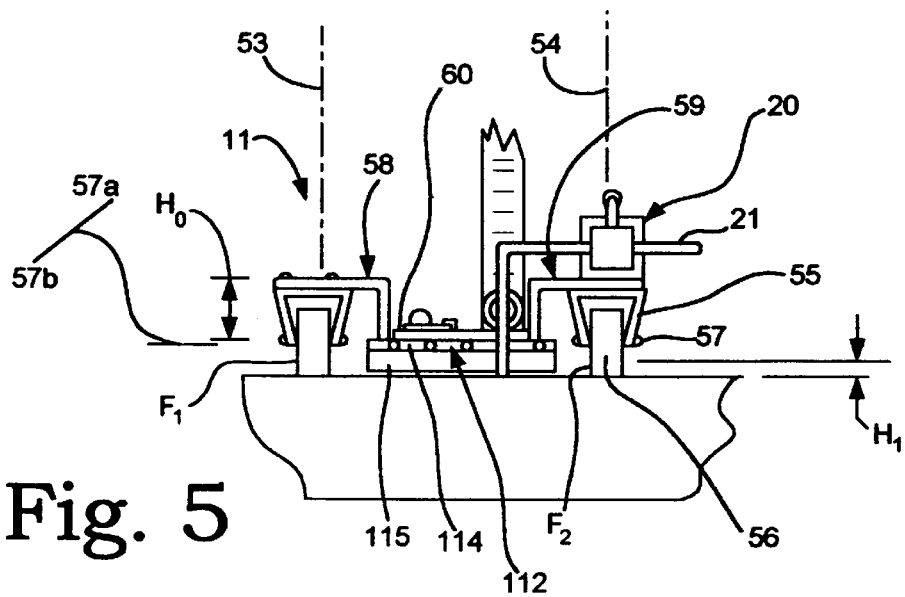
FIG. 5 is an end view of the platform of FIG. 3.

As shown best in FIG. 5, the platform 11 includes flared pairs of L-shaped side walls 58, 59. The walls 58, 59 are integrally attached to planar base 60. Note in FIG. 4 that leg 61 of each side wall 58, 59 extends parallel to top, broad surface 18 of the green concrete 12 but upright leg 62 is normal to both the surface 18 and the planar base 60. The sets of rollers 22 attach to the undersurfaces of the transverse legs 61 of the side walls 58, 59 wherein the diameters of the wheels 56 and the height Ho of the upright legs 62 are interrelated so that the planar base 60 is closely adjacent to the top surface 18 of the slab 12 a height H1.

That is, the planar base 60 is horizontally positioned above the surface 18 by the height H1 that is directly related to the wheel diameter of the rollers 22 and the height of the side walls 58, 59.

The purpose of the planar base 60 and side walls 58, 59 is to form a rigid recess to slidably but fixably accept underside 63 of the guide plate 15 (see FIG. 6) so that the saw blade 15 of the saw 10 can penetrated both rectangular opening 39 of the guide plate 15 and central slot 66 of the planar base 60. In this regard, transverse side edges 67 (see FIG. 6) of the guide plate 15 are in frictional but slidable contact with the upright legs 62 of the L-shaped side walls 58, 59 to prevent sidewise movement of the guide plate 15 relative to the base 60. Front edge 64 (also see FIG. 6) attaches under L-shaped lip 65 at the forward portion of planar base 60, see FIG. 4, to prevent forward rectilinear travel of the guide plate 15. Toward the mid-span of the planar base 60 is the slot 66 that, as previously mentioned, is axially aligned with the opening 39 of the guide plate 15. At the rear portion of the base 60, attachment of the guide plate 15 is via a fastener indicated at 69 see FIG. 4 adjacent to slot 66. In order to accommodate different thickness that may occur in guide plate 15, a forward attaching fastener 68 (see FIG. 4) can be added at the L-shaped lip 65 as shown.

Figure 7:
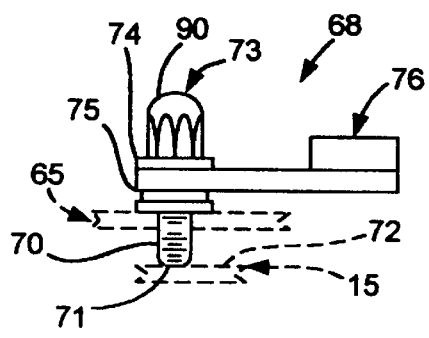
FIGS. 7 and 8 are detailed side elevational view of the pair of the forward and rearward quick release fasteners, respectively, of FIG. 4 showing the guide plate of the saw in phantom line.

FIG. 7 illustrates quick release fastener 68 in more detail.

As shown, fastener 68 comprises a left-hand threaded pin 70 threadably engaged to the lip 65. The pin 70 has an end 71 that moves downward into contact with upper surface 72 of the guide plate 15. Such movement of the pin 70 carries with the latter, the following: lock nut 73, spring-loaded clips 74 and 75 and push arm 76. Their operation will be explained in more detail below with reference to FIGS. 9–12.

Figure 8:
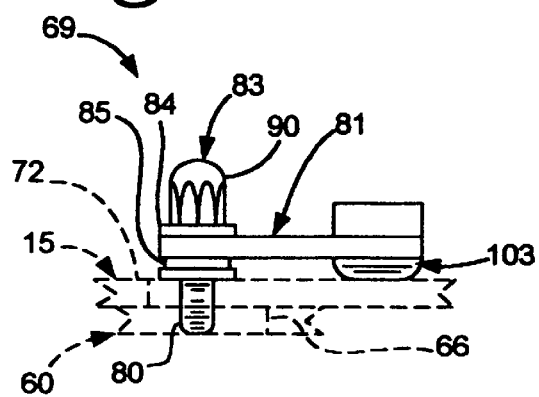

FIG. 8 shows quick release fastener 69 in more detail.

As shown, the fastener 69 attaches to threaded stud 80 permanently attached to planar base 60 adjacent to slot 66 and includes a rotatable wedge 61 that rotates about stud 80 into contact with upper surface 72 of the guide plate 15 of the saw 10. Rotation of the wedge 81 carries with the latter the following: lock nut 83 and spring-loaded clips 84 and 85. Their operation will be explained in reference to FIGS. 9–11 and 13.

Figure 9:
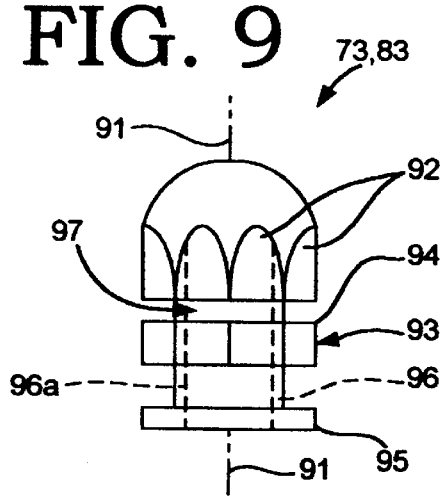
FIGS. 9 and 10 are detailed side elevational and top elevational views, respectively, of a domed lock nut used to form the pair of fasteners of FIGS. 7 and 8.
Figure 10:
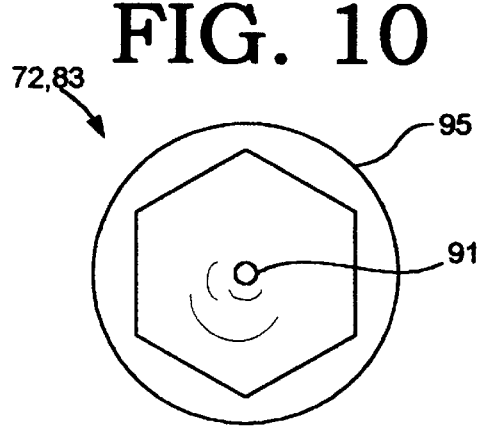

In explaining the operation of the quick release fasteners 68, 69, note that FIGS. 9 and 10 show lock nut 73, 83 in more detail.

Figure 12:
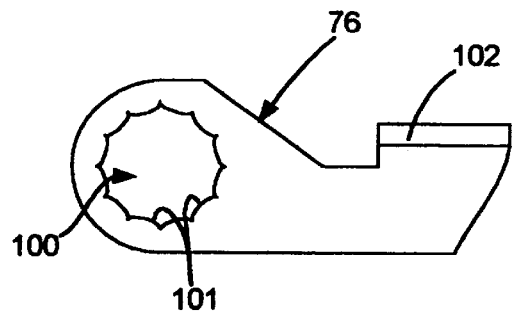
FIG. 12 is a detailed side elevational view of a pivot arm used to form the forward fastener of FIG. 7.
Figure 13:
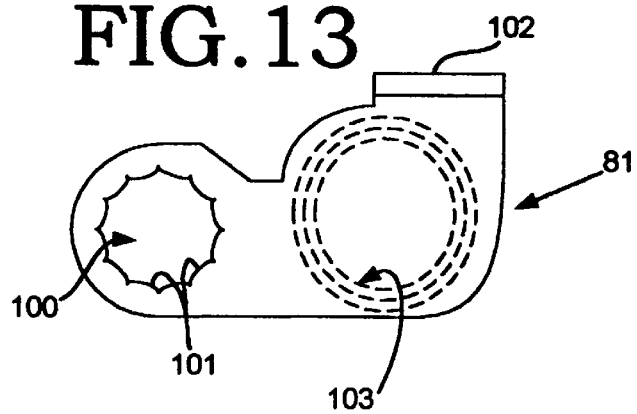
FIG. 13 is a detailed side elevational view of a wedge used to form the rearward fastener of FIG. 8.

As shown, the lock nut 73, 83 includes dome 90 having an axis of symmetry 91 and a series of flat sides 92 in which each diametrically opposed pair (relative to axis of symmetry 91) in parallel. At the terminus of the dome 90 is a cylindrical housing 93 defining a series of shoulders 94, 95 between recesses 96a, 96b exterior of threaded bore 97. The shoulder 94 has its outer periphery worked to match the shape of the flat sides 92 of the dome 90. Thus when the push arm 76 of FIG. 7 and rotatable wedge 81 of FIG. 8 is slid over the dome 90 and pass to the shoulder 94, a working position is defined wherein rotation of the former, causes corresponding movement of the dome 90 and housing 93. Clips 74, 75, 84 and 85 have spring-biasing legs 98 (see FIG. 11) that are retained within recesses 96a, 96b to anchor the push arm 76 (FIG. 7) and wedge 81 (FIG. 8) in working relationship with shoulder 94. In this regard, both the push arm 76 and the wedge 81 as shown in FIGS. 12 and 1, respectively, include a central opening 100 having its side wall 101 sectored into 12 areas to permit the formed to be fitted at various angles so that only a minimum of an one/half turn on or less will affect closure to the element to be retained. Up-right fin 102 at the end of the arm 76 and rotatable wedge 81 permits an user's thumb to force rotation to force closure. In this regard, note that the type of closure caused by rotation of the arm 76 differs from that of wedge 81. In FIG. 7, closure is via movement of pin end 71 into contact with the upper surface 72 of the guide plate 15. While in FIG. 8, the wedge 81 itself include a truncated ellipsoid 103 which rotate into bearing contact with surface 72 of the guide plate 15.

METHOD ASPECTS OF THE INVENTION

In operation, as shown in FIGS. 1, 3 and 6 the saw 10 is disconnectable connected to the floor plate 11, and the saw 10 and floor plate 11, in combination, are moved along the sight line 17 placed on the surface 18 of the green concrete 12. These is achieved by stretching a chalked line across the concrete in the correct direction to relieve stress and then snapping the taunt chalked line to create the sight line 17. Movement over surface 18 of the stab 12 is aided the fact that the pairs of rollers 22a, 22b interface between the surface 18 of green concrete 12 and the moving saw 10 and plate 11 combination. Source of such movement is via an user (not shown) who applies force to the saw 10 and floor plate 11 via push rod 19.

In this regard, the planar base 60 of the platform 11 (see FIG. 4) also has a rear portion provided with a push pole adapter 35 attached to one end of the push rod 19. The adapter 35 includes a cylindrical housing 36 which accepts the end of the aluminum or fiberglass push rod 19 and terminates in a bifurcated bracket 37. The bracket 37 includes pair of parallel fingers 37a, 37b defining an opening (not shown) therebetween through which an anchoring ear 38 extends. The anchoring ear 38 includes a base 38a attached to the planar base 60. The ear 38 and the fingers 37a, 37b are provided with alignable openings (not shown) through which an attaching bolt extend, the latter being capped by a conventional attachment nut.

In the transverse direction, the ear 38 is preferably aligned with the slot 66 of the planar base 60 and with a third working plane of reference G—G which bisects the slot 66 and is coextensive of the saw blade 40 of the saw 10. In that way, the pushing force applies to the platform 11 via rod 19 is also coextensive of the working plane G—G so minimum disruptive force is applies to saw blade 40 during operations.

That is, all component push forces are coextensive of plane G—G which, in turn, is coincident with the saw blade 40. Note also that while ear 38 is slightly outside the rear rolling plane D—D associated with the rear set of rollers 22b, the ear 38 is well within lateral (side) planes 53, 54 formed from one each of front and rear rollers 22a, 22b. Such planes 53, 54 pass through the L-shaped side walls 58, 59 and are normal to the top surface 18 of the slab 12. Furthermore, since the center of the ear 38 is outside the rolling plane D—D, a moment of force is generated that is exterior of the rear rolling plane D—D so as to provide a downwardly acting loading of the rear set of rear rollers 22b wherein slippage relative to the top surface 18 of the green concrete slab 12 is minimized. Hence, a stable platform 11 is provided with minimum disruptive characteristics.

During movement, the user is also aided by the function of guide arm 20 including marking pin 21. As shown in FIG. 4, guide arm 20 includes mount 77 attached to lthe L-shaped shoulder 59 of the planar base 60. Slidably secured within mount 77 is slidable guideway 78 that cantilevers from the mount 77, At the end of the guideway 78 is the marking pin 21 alignable with the sight line 17. A pair of threading pins 79a, 79b afix the guideway 78 relative to the mount 77 and the marking pin 21 relative to the guideway 78, respectively.

During operation, dust clouds 110 (see FIG. 1) comprising particles of concrete are usually created. Note such clouds 110 result, in part, from the fact that the saw 10 is rotating in the up-cut motion such that the rotation of the blade 40 (see FIG. 6) is out of the plane of the concrete 12 in the direction of arrow 111. While such motion does keep the groove 13 somewhat clear of concrete particles, it also can obscure the sight line 17.

In order that such clouds 110 do not obscure the sight line 17, the present invention provides a pair of dust skirts 112, 113 along the front edge and a side edge of the floor plate 11, see FIGS. 1, 3–6. The dust skirts 112, 113 each comprising a U shaped bracket 114 (see FIG. 6) that capture skirt 115 of rectangular cross section so the terminating edge is slightly above the surface 18 of the concrete slab 12.

In summary, the method of the invention encompasses steps that perform the above. That is, there is disclosed a method of cutting a groove 13 in broad top surface 18 of the green concrete slab 12 that also includes terminating side edge 52 (see FIG. 1) transverse to the broad surface 18, using hand-held portable rotary saw 10 conventional for use in construction work in disconnectably connection with wing-shaped floor plate 11 rollerably attached to the top surface 18, comprising the steps of:

(a) smoothing and compacting a top broad surface 18 of the green concrete slab 12 which has at least one terminating side edge 52 transverse to the broad surface 18, (b) providing a sight line 17 along the top surface 18, (c) cutting a groove 13 in the top surface 18 along the sight line 17 using upcut rotation of saw blade 41 of a conventional rotary, portable saw 10 of conventional design, disconnectably attached to the platform 11 rollably supported on the top surface 18 by a set of rollers 22, the cutting occurring before the green concrete slab 12 has hardened sufficiently to allow cutting by a conventional abrasive concrete saw.

The above description contains several specific embodiments of the invention. It is not intended that such be constructed as limitations on the scope of the invention, but merely as examples of preferred embodiments. Persons skilled in the art can envision other obvious possible variations within the scope of the description. For example, the rollers pairs 22a and 22b could be increased in width if desired to increase transverse friction to hold a given line of movement. Still further, the electrical conductor 26 that transmits electrical energy to power the saw 10, can be provided with separate ON-OFF switches positioned adjacent to the end of the push rod 19. In addition, a pressure plate could be attached to the underside of the platform 11 about the opening 39 of the guide plate 15 and slot 66 in the planar base 60. Its purpose: to pack down the green concrete 12 to prevent damage ("spalding") in the region about the cut under some cutting operations. The pressure plate would be wing-shaped and have a narrow opening through which the saw blade 40 extends. Hence, the scope of the invention is to be determine by the appended claims and their legal equivalents.

IMPROVEMENT

In order to increase stability and speed operations, the invention previously mentioned has been modified as shown in FIGS. 14–23.

In this regard, note that conditions that affect the rate of drying of the concrete, include the following: humidity, temperature and time. These conditions vary from job site to job site and it would be valuable to provide an cutting apparatus that takes into account such conditions as the stress relieving operations occur.

Figure 16:
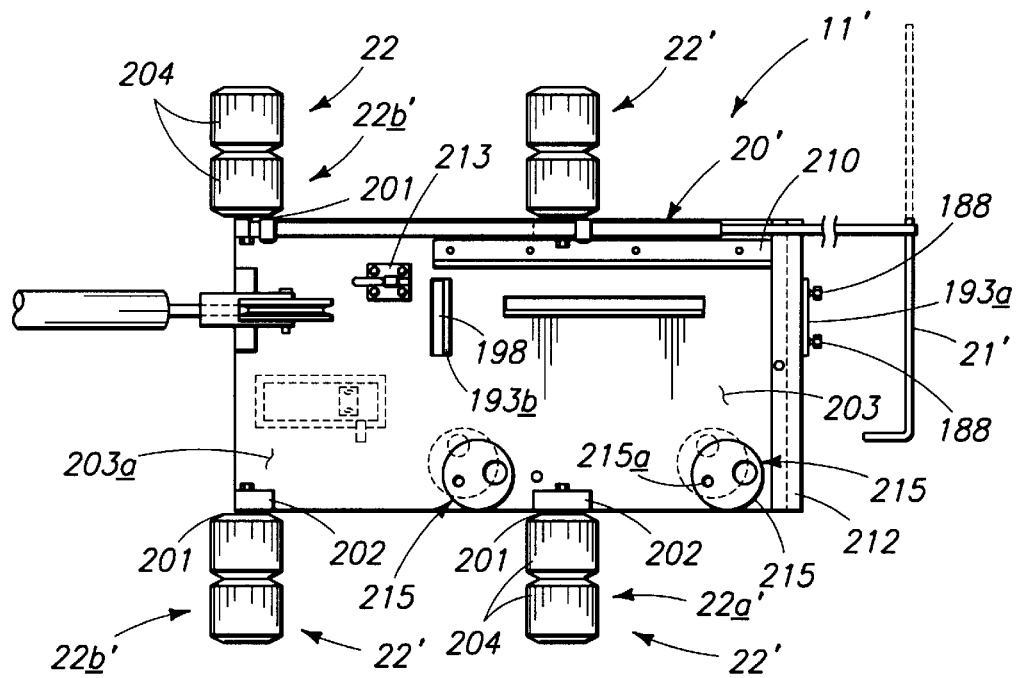
FIG. 16 is a top view of the platform of FIG. 15.
Figure 15:
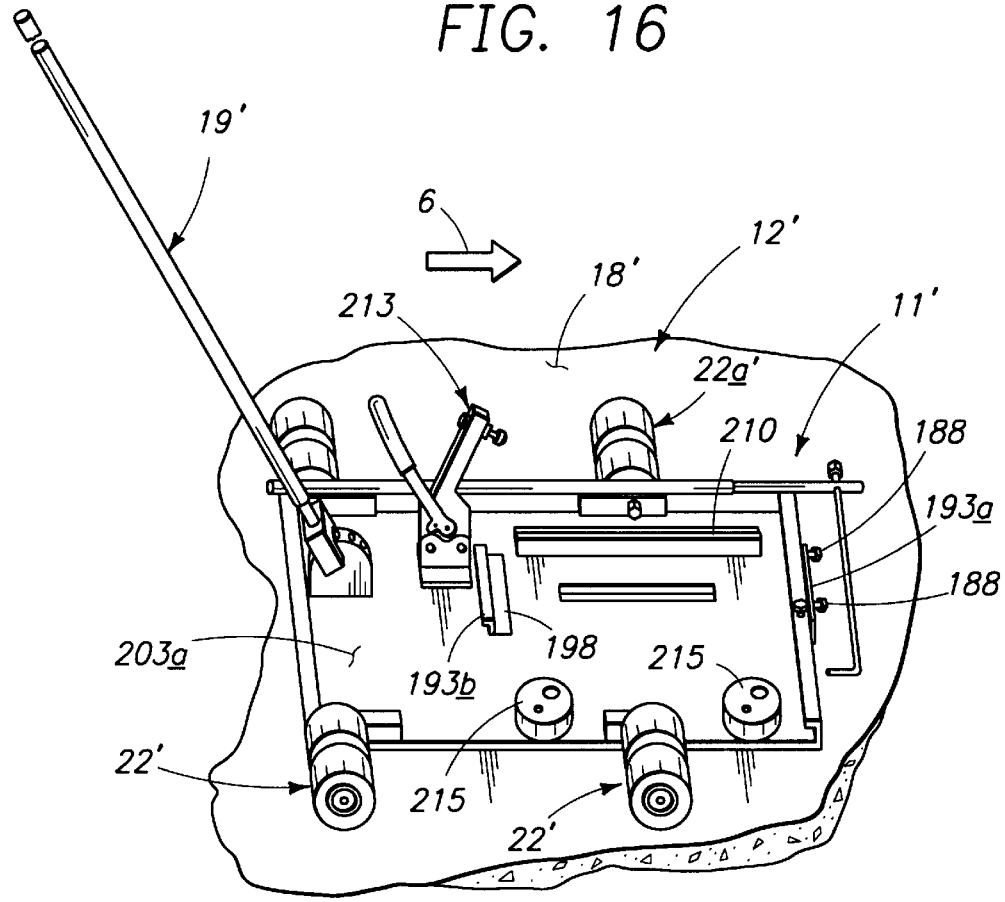
FIG. 15 is a perspective view of the platform of FIG. 14.
Figure 20:
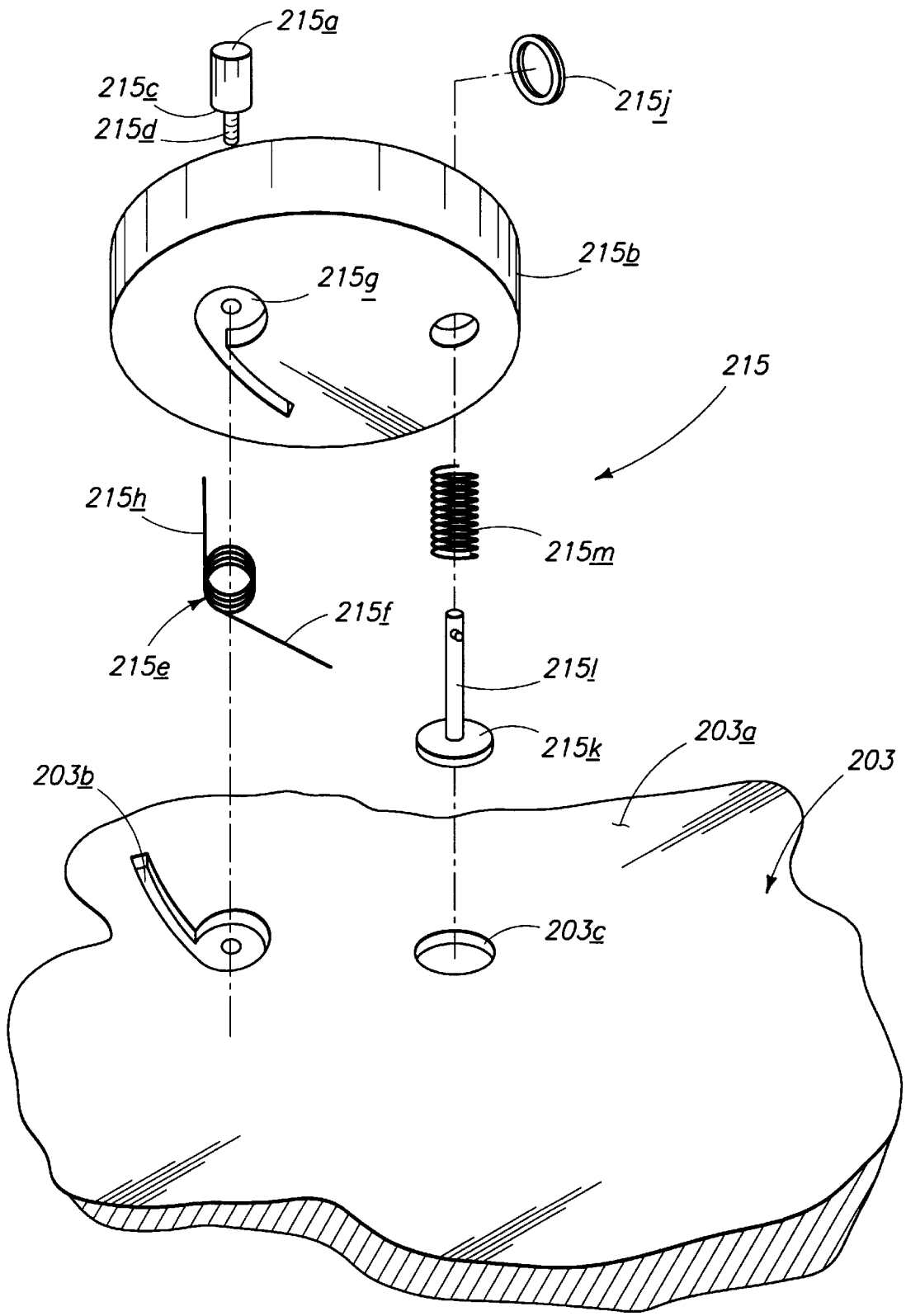
FIG. 20 is a detail exploded view of a locking cam used in the invention.

FIGS. 14–16 show an improved apparatus 5 of the invention which includes a hand-held portable saw 10' in disconnectable contact with a modified platform 11' for use atop a slab 12' of newly poured green concrete (see FIG. 15) to provide a transverse cut or groove to relieve stress. The saw 10' has been previously described and such description is incorporated herein and includes a housing 14' and guide plate 15', such guide plate 15' having a central opening 39' through which a saw blade 40' can extend.

The rotating saw 10' and platform 11', in combination, are moved along a sight line (usually a chalked line) on top surface 18' of the green concrete 12' by an user (not shown). Such user applies force to the platform 11' via a push rod assembly 19' to cause movement in the direction of arrow 6.

FIG. 24 shows the push rod assembly 19' in detail.

As shown, the push rod assembly 19' includes a sectored base 19'a, a rotatable yoke 19'b having spring-loaded detent 19'c for engagement with one of several openings 19'd in the sectored base 19'a to change the elevation of push rod 19'e.

Returning to FIGS. 14–15, note that the guide arm 20' is attached to the platform 11' and includes a marking stick 21' alignable with the sight line of the groove to be provided'. Positioned ahead of the saw blade 40' (FIG. 14) is a pressure plate assembly 190 those function is to compact the green concrete immediately forward of the saw blade 40'. The amount of compaction is variable due to the fact that pressure plate assembly 19' is permitted to move vertically with respect to the slab in the direction of arrow 189.

FIGS. 17 and 18 show the pressure plate assembly 190 in more detail.

As shown, the pressure plate assembly 190 includes a U-shaped housing 192 having end flaps 193a, 193b. Forward flap 193a is provided with slots 187 while rearward flap 193b is upright, but slightly bent at end 193c where end 193b about normal to the upright portion of the flap 193b. In the mid-portion 194 of the housing 192 is a series of springs 195, each preferably equidistance with respect to axis of symmetry 196. A central slot 197 is also defined by the axis of symmetry 196 to permit the saw blade 40' (FIG. 14) to penetrate the mid-portion 194 of the housing 192.

Returning to FIGS. 14–16, note that end flaps 193a, 193b of the pressure plate assembly 190 extend upward (relative to the slab 12') and slidably connect to the platform 11' via a pair of bolts 188 of less diameter than the slots 194 (for forward flap 193a) and squeezing of the rearward flap 193b through opening 198 in the platform 11' where about ¼ inch of vertical play is permitted. Hence, as movement over the slab 12' occurs, the mid-portion 194 of the U-shaped housing 192 (FIG. 18) in combination with the action of springs 195, packs down soft concrete ahead of the saw blade a changing degree irrespective of the small but important variations in the drying time of the slab. That is, the downward force exerted by the mid-portion 194 of the U-shaped housing 192 is constant but the amount the same compacts the slab 12' varies based on the degree of hardness of the surface of such slab 12' (because of drying conditions previously mentioned), so as to provide a groove with acceptable edge quality. Note that movement of the platform 11' (along with the saw blade 40' of the saw 10') is provided by sets of rollers 22' attached to the latter, as explained below.

As best shown in FIG. 16, the sets of rollers 22' include a forward or front pair 22a' and a rearward or rear pair 22b'. Each of the forward pair 22a' includes a shaft 201 cantilevered from a bracket 202 attached to upper surface 203a of planar support 203 of the platform 11'. At the end of shaft 201 is a dual set of side-by-side plastic wheels 204. Each of the rearward pair 22b' includes is similar to the forward pair 22a previously mentioned, viz., includes a shaft 201 cantilevered from a bracket 202 attached to upper surface 203a of planar support 203 of the platform 11'. At the end of shaft 201 is a dual set of side-by-side plastic wheels 204, provides a total width that is about double that of the platform previously described hereinbefore.

Returning to FIG. 14, note that the saw 10' includes a remotely activated, electronic ON-OFF switch 24' for ON-OFF disconnectable connection to an electrical source (not shown) via a conductor 26'. Activation of the switch 24' is via a remote controller (not shown) having a radio frequency transmitter and button matrix under control of the user.

FIGS. 14–16 also illustrate how the guide plate 15' of the saw 10' is attached to the platform 11'.

As shown, the upper surface 203a of planar support 203 of the platform 11' is provided with the following fixed elements: a side anchor 210 having a length greater than that of the side surface of the guide plate 15', a forward inverted L-shaped anchor 212 that disconnectably connects to the front surface of the guide plate 15', and a rear locking view anchor 213 that rotates in a downward direction against the broad top surface of the guide plate 15'.

FIG. 1 shows the rear locking view anchor 213 in more detail.

As shown, the rear locking vise anchor 213 has a base 213a and counter acting handle 213b controlling a rotating arm 213c in which downward rotation of the handle 213b produces downward rotation of arm 213c followed by locking of the latter against the guide plate 15' via an over-center operation associated with cam surface 213d. The locking vise anchor 213 is a conventional product and can be purchased from the De-Sta-Co incorporated as part No.215U.

Returning again to FIGS. 14–16, note that a remaining side surface of the guide plate 15' is adjustably placed in disconnectable contact with a pair of adjustable locking cams 215

FIGS. 20–23 in association with FIG. 16, show how the locking cam 215 operates.

As shown the locking cam 215 includes an off-set pivot pin 215a, about which cam body 215b eccentrically rotates. The pivot pin 215a has a shoulder 215c and a threaded head 215d that extends through torsion spring 215e having an arm 215f that fits within recess 215g within the cam body 215b and an arm 215h that fits within recess 203b within the upper surface 203a of planar support 203 of the platform. The position of the recesses 215g and 203b is such that a counterclockwise force (see FIG. 16) is applied to the cam body 215b to cause eccentric rotation to an inward position shown in phantom line for contact with the side surface of the guide plate of the saw. To secure the cam body 215b after clockwise rotation away from the aforementioned position, say to release the guide plate of the saw, locking pin 215i that includes a pull ring 215j at one end and an enlarged head 215k at the other end under compression via a spring 215m, is in operations such the enlarged head 215k guides into recess 203c within the upper surface 203a of planar support 203 of the platform. Similarly, upward movement of the enlarged head 215k via the pull ring 215j, releases the enlarged head 215k from the recess 203c and permits same to slide in an arc over the upper surface 203a of planar support 203 of the platform.

What is claimed is:

1. Apparatus for cutting grooves in a green concrete slab having at least one terminating side edge transverse to a broad top surface, comprising:

a hand-held portable rotary saw having a housing, a guide plate defining (i) end and side edges and (ii) a broad undersurface and opening therethrough, a saw blade being attached to said housing rotatable relative thereto about an axis of rotation in an up-cut direction, said saw blade including an outer curved sector extending through said opening of said guide plate, means for releasably attaching said guide plate relative to said housing to permit incremental rotation of said guide plate relative to said housing to change height of said axis of rotation of saw blade relative to a first working plane of reference through said guide plate, rollable platform disconnectably connected to and supporting said saw atop a green concrete slab, said rollable platform including a planar base in surface contact with said guide plate of said saw, said planar base in surface contact with said guide plate of said saw, said planar base having a rearward anchoring portion adapted to receive a human-generated force to provide said platform and said saw with rectilinear travel along a preselected direction over said green concrete slab having a top surface, said planar base also including a slot in alignment with said opening of said guide plate through which said sector of said saw blade extends, said saw blade defining a second working plane of reference that intersect said axis of rotation of said saw blade and intersect said top surface of said green concrete slab and intersects said first working plane of reference of reference whereby a maximum of cut generated by said saw blade relative tao said top surface of said slab during operations, is defined coincidental with said second working plane of reference and is measured relative to said first working plane of reference, a set of rollers attached to said rotatable platform in rolling contact with said green concrete slab to facilitate said rectilinear travel in said pre-selected direction, said set of rollers including first and second front rollers and third and fourth rear rollers, said front and rear rollers each defining a pair of coincident axes of rotation normal to said pre-selected direction, said front and rear rollers also defining first and second transverse dynamically occurring rolling planes, respectively, each of which being coincident with respective axis of rotation and coincident with respective intersections of said front and rear rollers with said top surface of said green concrete slab, said rolling planes being positioned such that (i) said rearward anchoring portion of said planar base adapted to receive said human-generated force, stabilizes said platform and said saw during said rectilinear travel across said green concrete slab, and (ii) said second working plane of reference is forward of both rolling planes (1) whereby minimum disruptive forces are imparted to said saw blade during said rectilinear travel and (2) wherein said saw blade completes its maximum cut well prior to said front pair of rollers encountering any transverse terminating edge of said green concrete slab.

2. The apparatus of claim 1 in which said rollable platform includes flared side walls that are inverted L-shaped in cross section and having longitudinally extending legs normal to said planar base extending from side edges thereof, said longitudinally extending legs being in direct contact with said side edges of said guide plate of said saw thereby preventing sidewise movement thereof relative to said rollable housing during operations.

3. The apparatus of claim 2 in which inverted L-shaped side walls include transverse legs normal to said longitudinally extending legs land each includes a coplanar undersurface parallel with said planar base but atop same by a pre-selected height (H).

4. The apparatus of claim 1 in which said rollers are each of common wheel diameter wherein said saw blade extending through said slot in said planar base, is positioned relative to said top surface of said green concrete slab to execute a desired cutting depth therein.

5. The apparatus of claim 4, including a third working plane of reference normal to said first and second reference planes, said third working plane of reference bisecting said slot, said saw blade and said rear anchoring portion of said planar base wherein human-generated force for engendering travel is coextensive thereof whereby minimum sidewise torque is imparted to said saw blade during operations.

6. The apparatus of claim 5 in which said rearward anchoring portion of said planar base comprises a pole adaptor attached to said planar base having bifurcated fingers, a cylindrical housing having an end attached to said fingers, and a push pole having one end attached within said housing and another end adapted to be gripped by a human, said pole adaptor being bisected by said third plane of reference.

7. The apparatus of claim 4 in which said first and second front rollers and said third and fourth rear rollers are each formed a dual, side-by-side rollers to increase thread width.

8. The apparatus of claim 1 in which said slot of said planar base includes an L-shaped lip near a front edge of said slot and first and second quick attaching fasteners for releasably attaching said guide plate of said saw relative to said planar base.

9. The apparatus of claim 8 in which said first and second attaching fasteners each includes a thread stud mounted to said planar base of said floor plate, a cap nut including a shaft having a series of shoulders therealong, a wedge-arm means, and a series of spring-biased clips to attached said wedge-arm means to said cap nut whereby rotation of said cap nut carries said wedge-arm means and said series of clips therealong to provide quick-release function thereto.

10. The apparatus of claim 1, including a plurality of skirts attached to said rollable platform to substantially prevent emission of concrete dust.

11. The apparatus of claim 1, including a pressure plate assembly slidably attached to and extending from said planar base of said rollable platform, said pressure plate assembly including a mid-portion those position relative to said maximum depth of cut of said saw blade of said green concrete slab varies as a function of hardness of said slab.

12. The apparatus of claim 11 in which said pressure plate assembly includes end flaps attached to said mid-portion, one of said end flaps including slots for slidable attachment to said planar base of said rollable platform, said pressure plate assembly also including a series of springs depending from said mid-portion into load contact with said planar base.

13. The apparatus of claim 1, including a sight arm attached to and cantilevered forward of said rollable platform to aid in guiding said saw and platform over said slab.

* * * * *